United States Patent
Guo

(10) Patent No.: US 11,829,122 B2
(45) Date of Patent: Nov. 28, 2023

(54) INDUSTRIAL NETWORK BEHAVIOR ANALYSIS METHOD, APPARATUS AND SYSTEM, AND COMPUTER-READABLE MEDIUM

(71) Applicant: Siemens Aktiengesellschaft, Munich (DE)

(72) Inventor: Dai Fei Guo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/921,863

(22) PCT Filed: Apr. 30, 2020

(86) PCT No.: PCT/CN2020/088460
§ 371 (c)(1),
(2) Date: Oct. 27, 2022

(87) PCT Pub. No.: WO2021/217636
PCT Pub. Date: Nov. 4, 2021

(65) Prior Publication Data
US 2023/0119829 A1 Apr. 20, 2023

(51) Int. Cl.
*G05B 19/418* (2006.01)
(52) U.S. Cl.
CPC ............ *G05B 19/4185* (2013.01); *G05B 2219/23317* (2013.01)
(58) Field of Classification Search
CPC ............ G05B 19/4185; G05B 2219/23317
See application file for complete search history.

(56) References Cited

U.S. PATENT DOCUMENTS

2012/0198277 A1\* 8/2012 Busser ................ G06N 20/00
714/26
2017/0257437 A1 9/2017 Freund
(Continued)

FOREIGN PATENT DOCUMENTS

CN 102577305 7/2012
CN 103235882 8/2013
(Continued)

OTHER PUBLICATIONS

Mannila, H., Toivonen, H. & Inkeri Verkamo, A. Discovery of Frequent Episodes in Event Sequences. Data Mining and Knowledge Discovery 1, 259-289 (1997). https://doi.org/10.1023/A:1009748302351 (Year: 1997).\*
(Continued)

*Primary Examiner* — Christopher E. Everett
(74) *Attorney, Agent, or Firm* — Slayden Grubert Beard PLLC

(57) ABSTRACT

Various embodiments of the teachings herein include an industrial network behavior analysis method. The method may include: defining a first time window for a target industrial control system, for the target industrial control system to perform a control behavior; respectively determining an execution probability deviation for each control instruction within the first time window and using the execution probability to characterize the ratio of the number of times the corresponding control instruction is executed within a time period to the total number of times the control instruction within the time period; defining a second time window according to the control instruction characterizing a time period when the system performs the corresponding control behavior, and the control behavior is the same as that performed in the first time window. The method may include performing for each second time window: for each control instruction, calculating an execution probability; for each
(Continued)

control instruction, determining whether the execution probability meets a target deviation, wherein the target execution probability deviation is the execution probability deviation of the control instruction in the first time window corresponding to the same in the second; determining that the control instruction is legal if the execution probability meets the target deviation; and determining that the instruction is suspicious if the execution probability of the control instruction does not.

13 Claims, 11 Drawing Sheets

(56) References Cited

U.S. PATENT DOCUMENTS

2019/0271975 A1* 9/2019 Guo .................. G06F 3/0488
2019/0392141 A1* 12/2019 Bardini ............ G05B 19/41885

FOREIGN PATENT DOCUMENTS

| CN | 109144023 | 1/2019 |
| CN | 110224970 | 9/2019 |

OTHER PUBLICATIONS

Search Report for International Application No. PCT/CN2020/088460, 14 pages, dated Jan. 27, 2021.

* cited by examiner

INDUSTRIAL NETWORK BEHAVIOR ANALYSIS METHOD, APPARATUS AND SYSTEM, AND COMPUTER-READABLE MEDIUM

CROSS-REFERENCE TO RELATED APPLICATIONS

This application is a U.S. National Stage Application of International Application No. PCT/CN2020/088460 filed Apr. 30, 2020, which designates the United States of America, the contents of which are hereby incorporated by reference in their entirety.

TECHNICAL FIELD

The present disclosure relates to the technical field of communications. Various embodiments include industrial network analysis methods, apparatuses, and/or systems.

BACKGROUND

With the continuous development and advancement of the Internet of Things (IOT) and operational technology (OT), large production enterprises are required to monitor all industrial control systems within a single security monitoring system. Therefore, different industrial control systems will be connected to the same security monitoring system to form an OT network. However, due to the weak security defense capability of industrial control systems, the risk of malicious attacks of the OT network is high. In order to ensure the security of an OT network, the control instructions among the control devices in an industrial control system may be collected, and then the industrial network behavior may be analyzed by use of the collected control instructions, to determine whether the OT network is at risk of malicious attacks.

At present, a trust list is created in advance for an industrial control system, which stores the identification information of trusted control instructions. After the control instructions among the control devices in the industrial control system are collected, it is determined whether a collected control instruction is recorded in the trust list. If a collected control instruction is recorded in the trust list, it is determined that the collected control instruction is a legal one. If not, it is determined that it is an abnormal control instruction, and that the OT network is at risk of malicious attacks.

With existing methods for analyzing industrial network behaviors, it is necessary to compare each control instruction with the trust list to determine whether the collected control instructions correspond to abnormal operation behaviors based on the pre-created trust list, and so it is only applicable to simple control processes with a relatively small number of control instructions, but not to complex control processes with large numbers of control instructions. Therefore, the applicability of the existing industrial network behavior analysis methods is poor.

SUMMARY

In view of the above, the industrial network behavior analysis method, apparatus and system and the computer-readable medium provided by the present disclosure can improve the applicability to industrial network behavior analysis. For example, some embodiments include an industrial network behavior analysis method, comprising: defining at least one first time window for a target industrial control system (30), wherein the first time window is used to characterize a time period for the target industrial control system (30) to perform a corresponding control behavior; respectively determining an execution probability deviation of each control instruction in the target industrial control system within each first time window, wherein the execution probability deviation is used to characterize the fluctuation of the execution probability of the corresponding control instruction, and the execution probability is used to characterize the ratio of the number of times the corresponding control instruction is executed within a time period to the total number of times the control instruction is executed within the time period; collecting the control instruction executed in the target industrial control system (30); defining at least one second time window according to the collected control instruction, wherein the second time window is used to characterize a time period when the target industrial control system (30) performs the corresponding control behavior, and the control behavior performed by the target industrial control system (30) in the second time window is the same as that performed in the first time window; performing the following for each second time window: for each control instruction executed in the second time window, calculating the execution probability of the control instruction in the second time window; for each control instruction executed in the second time window, determining whether the execution probability of the control instruction meets a target execution probability deviation, wherein the target execution probability deviation is the execution probability deviation of the control instruction in the first time window corresponding to the same control behavior in the second time window; determining that the control instruction is a legal control instruction if the execution probability of the control instruction meets the target execution probability deviation; and determining that the control instruction is a suspicious control instruction if the execution probability of the control instruction does not meet the target execution probability deviation.

In some embodiments, defining at least one first time window for a target industrial control system (30) comprises: collecting the control instruction executed in the target industrial control system (30) in a preset learning time period; when a first control instruction corresponding to the start identifier of a preset time window is collected, determining the time when the first control instruction is collected as the starting point of the time window; when a second control instruction corresponding to the end identifier of the preset time window is collected, determining the time when the second control instruction is collected as the ending point of the time window; defining the time period between each pair of sequentially adjacent starting point of the time window and ending point of the time window as a third time window; for each third time window, defining a third time window as a fourth time window if the control instruction collected in the third time window satisfies a preset complexity rule; grouping the fourth time windows to obtain at least one time window group, wherein each time window group comprises at least one fourth time window, and the target industrial control system (30) performs the same control behavior within each of the fourth time windows comprised in the same time window group and performs different control behaviors within the fourth time windows comprised in different time window groups; and forming a corresponding first time window for each time window group, wherein the first time window and each of the fourth time windows comprised in the time window group corresponding to the first time window have the same starting point and end point of the time window, or the first time window and each of the fourth time windows comprised in the time window group corresponding to the first time window have the same time length.

In some embodiments, respectively determining an execution probability deviation of each control instruction in the target industrial control system within each first time window comprises: for each fourth time window, calculating the execution probability of each of the control instructions executed in the fourth time window; performing the following for each time window group: for each control instruction executed in each of the fourth time windows comprised in the time window group, calculating the execution probability deviation of the control instruction in the first time window corresponding to the time window group according to the execution probability of the control instruction in each of the fourth time windows comprised in the time window group.

In some embodiments, defining at least one second time window according to the collected control instruction comprises: identifying the start identifier and the end identifier of the time window from the collected control instruction; for each identified start identifier of the time window, determining the time when the control instruction corresponding to the start identifier of the time window is collected as the starting point of the time window; for each identified end identifier of the time window, determining the time when the control instruction corresponding to the end identifier of the time window is collected as the ending point of the time window; defining the time period between each determined pair of sequentially adjacent starting point of the time window and ending point of the time window as a fifth time window; and for each fifth time window, defining the fifth time window as a second time window if the control instruction collected in the fifth time window satisfies the complexity rule and there is a first time window corresponding to the same control behavior as that of the fifth time window.

In some embodiments, after defining the time period between each determined pair of sequentially adjacent starting point of the time window and ending point of the time window as a fifth time window, the method further comprises: for each fifth time window, if the control instruction collected in the fifth time window does not satisfy the complexity rule, determining whether each control instruction executed in the fifth time window is on a preset instruction white list; if the control instruction is on the preset instruction white list, determining that the control instruction is a legal control instruction; and if the control instruction is not on the preset instruction white list, determining that the control instruction is a suspicious control instruction.

In some embodiments, the control instruction comprises at least one control command sequentially executed, wherein the control command is a basic unit for device control and status feedback in the target industrial control system (30), and each control command may comprise at least one related parameter.

As another example, some embodiments include an industrial network behavior analysis apparatus (10), comprising: a first identification module (11), used to define at least one first time window for a target industrial control system (30), wherein the first time window is used to characterize a time period for the target industrial control system (30) to perform a corresponding control behavior; a deviation calculation module (12), used to respectively determine an execution probability deviation of each control instruction in the target industrial control system within each first time window defined by the first identification module (11), wherein the execution probability deviation is used to characterize the fluctuation of the execution probability of the corresponding control instruction, and the execution probability is used to characterize the ratio of the number of times the corresponding control instruction is executed within a time period to the total number of times the control instruction is executed within the time period; an instruction collection module (13), used to collect the control instruction executed in the target industrial control system; a second identification module (14), used to define at least one second time window according to the control instruction collected by the instruction collection module (13), wherein the second time window is used to characterize a time period when the target industrial control system (30) performs the corresponding control behavior, and the control behavior performed by the target industrial control system (30) in the second time window is the same as that performed in the first time window; a probability calculation module (15), used to, for each second time window defined by the second identification module (14), calculate the execution probability of a control instruction in the second time window for each of the control instructions executed in the second time window; a probability comparison module (16), used to, for each second time window defined by the second identification module (14), for each of the control instructions executed in the second time window, determine whether the execution probability of the control instruction calculated by the probability calculation module (15) meets a target execution probability deviation, wherein the target execution probability deviation is the execution probability deviation of the control instruction in the first time window corresponding to the same control behavior in the second time window as calculated by the deviation calculation module (12); and a first analysis module (17), used to, based on the result of the probability comparison module (16), determine that a control instruction is a legal control instruction if the execution probability of the control instruction meets the target execution probability deviation, and that a control instruction is a suspicious control instruction if the execution probability of the control instruction does not meet the target execution probability deviation.

In some embodiments, the first identification module (11) comprises: a collecting unit (111), used to collect the control instruction executed in the target industrial control system (30) in a preset learning time period; a first identification unit (112), used to determine the time when a first control instruction is collected as the starting point of the time window when the collecting unit (111) collects the first control instruction corresponding to the start identifier of a preset time window, and determine the time when a second control instruction is collected as the ending point of the time window when the collecting unit collects the second control instruction corresponding to the end identifier of the preset time window; a first extraction unit (113), used to define the time period between each determined pair of sequentially adjacent starting point of the time window and ending point of the time window determined by the first identification unit (112) as a third time window; a first filtering unit (114), used to, for each third time window defined by the first extraction unit (113), define a third time window as a fourth time window if the control instruction collected in the third time window satisfies a preset complexity rule; a time window grouping unit (115), used to group the fourth time windows defined by the first filtering unit (114) to obtain at least one time window group, wherein each time window group comprises at least one fourth time window, and the target industrial control system (30) performs the same control behavior within each of the fourth time windows comprised in the same time window group and performs different control behaviors within the fourth time windows comprised in different time window groups; and a time window generation unit (116), used to form a corresponding first time window for each time window group defined by the time window grouping unit (115), wherein the first time window and each of the fourth time windows comprised in the time window group corresponding to the first time window have the same starting point and end point of the time window, or the first time window and each of the fourth time windows comprised in the time window group corresponding to the first time window have the same time length.

In some embodiments, the deviation calculation module (12) comprises: a probability calculation unit (121), used to, for each time window group, respectively calculate the execution probability of each of the control instructions executed in each of the fourth time windows comprised in the time window group; and a deviation calculation unit (122), used to, for each time window group, for each control instruction executed in each of the fourth time windows comprised in the time window group, calculate the execution probability deviation of the control instruction in the first time window corresponding to the time window group according to the execution probability of the control instruction in each of the fourth time windows comprised in the time window group as calculated by the probability calculation unit (121).

In some embodiments, the second identification module (14) comprises: a second identification unit (141), used to identify the start identifier and the end identifier of the time window from the collected control instruction; a starting point determination unit (142), used to, for each identified start identifier of the time window identified by the second identification unit (141), determine the time when the control instruction corresponding to the start identifier of the time window is collected as the starting point of the time window; an ending point determination unit (143), used to, for each identified end identifier of the time window identified by the second identification unit (141), determine the time when the control instruction corresponding to the end identifier of the time window is collected as the ending point of the time window; a second extraction unit (144), used to define the time period between each pair of sequentially adjacent starting point of the time window and ending point of the time window determined by the starting point determination unit (142) and the ending point determination unit (143) as a fifth time window; and a second filtering unit (145), used to, for each fifth time window defined by the second extraction unit (144), define the fifth time window as a second time window if the control instruction collected in the fifth time window satisfies the complexity rule and there is a first time window corresponding to the same control behavior as that of the fifth time window.

In some embodiments, the apparatus further comprises a second analysis module (18) used to, for each fifth time window defined by the second extraction unit (144), if the control instruction collected in the fifth time window does not satisfy the complexity rule, determine whether each control instruction executed in the fifth time window is on a preset instruction white list, and that a control instruction is a legal control instruction if the control instruction executed in the fifth time window is on the instruction white list and a control instruction is a suspicious control instruction if the control instruction executed in the fifth time window is not on the instruction white list.

In some embodiments, the control instruction comprises at least one control command sequentially executed, wherein the control command is a basic unit for device control and status feedback in the target industrial control system (30), and each control command may comprise at least one related parameter.

As another example, some embodiments include an industrial network behavior analysis apparatus (20), comprising: at least one memory (21) and at least one processor (22); the at least one memory (21) is used to store a machine-readable program; the at least one processor (22) is used to call the machine-readable program to execute one or more of the methods described herein.

As another example, some embodiments include an industrial network behavior analysis system (100) comprising an industrial network behavior analysis apparatus (10, 20) as described herein and at least one industrial control system (30).

As another example, some embodiments include a computer-readable medium, characterized in that the computer-readable medium stores a computer instruction, which, when executed by a processor, causes the processor to execute one or more of the methods as described herein.

REFERENCE NUMERALS IN THE DRAWINGS

Figure 1:
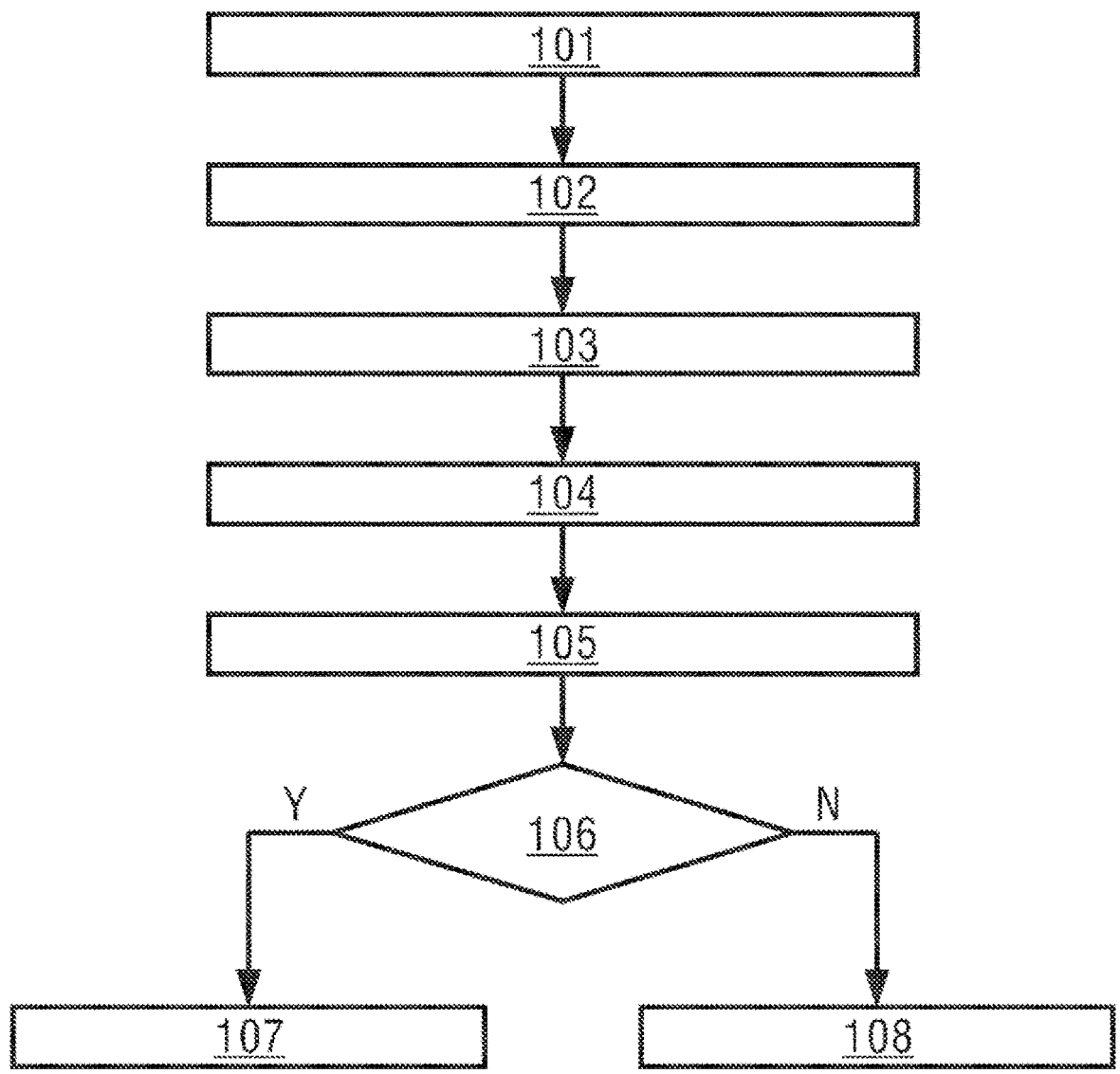
FIG. 1 is a flowchart of an industrial network behavior analysis method incorporating teachings of the present disclosure.

101: Defining at least one first time window for a target industrial control system 102: Determining an execution probability deviation of each control instruction in the target industrial control system within each first time window
103: Collecting control instructions executed in the target industrial control system
104: Defining at least one second time window according to the collected control instructions
105: Calculating the execution probability of a control instruction in the corresponding second time window
106: Determining whether the execution probability of the control instruction in the second time window meets a target execution probability deviation
107: Determining that the control instruction is a legal control instruction
108: Determining that the control instruction is a suspicious control instruction
201: Collecting control instructions executed in the target industrial control system in a preset learning time period
202: Determining the starting point and the ending point of a time window
203: Defining the time period between each pair of sequentially adjacent starting point of the time window and ending point of the time window as a third time window
204: Defining a third time window as a fourth time window if the control instruction collected therein satisfies a preset complexity rule
205: Grouping the fourth time windows into at least one time window group
206: Forming a corresponding first time window for each time window group
301: Respectively calculating the execution probability of each of the control instructions executed in the fourth time window
302: Respectively calculating the execution probability deviation of each control instruction in the first time window corresponding to each time window group
401: Identifying the start identifier and the end identifier of the time window from the collected control instruction
402: Determining the time when the control instruction corresponding to the start identifier of the time window is collected as the starting point of the time window
403: Determining the time when the control instruction corresponding to the end identifier of the time window is collected as the ending point of the time window
404: Defining the time period between each pair of sequentially adjacent starting point of the time window and ending point of the time window as a fifth time window
405: Defining the fifth time window satisfying the complexity rule and with a corresponding first time window as a second time window

| | | |
|---|---|---|
| 10: Industrial network behavior analysis apparatus | 20: Industrial network behavior analysis apparatus | 30: Industrial control system |
| 11: First identification module | 12: Deviation calculation module | 13: Instruction collection module |
| 14: Second identification module | 15: Probability calculation module | 16: Probability comparison module |
| 17: First analysis module | 111: Collecting unit | 112: First identification unit |
| 113: First extraction unit | 114: First filtering unit | 115: Time window grouping unit |
| 116: Time window generation unit | 121: Probability calculation unit | 122: Deviation calculation unit |
| 141: Second identification unit | 142: Starting point determination unit | 143: Ending point determination unit |
| 144: Second extraction unit | 145: Second filtering unit | 18: Second analysis module |

-continued

| | | |
|---|---|---|
| 100: Industrial network behavior analysis system | 21: Memory | 22: Processor |

DETAILED DESCRIPTION

Some embodiments of teachings of the present disclosure provide an industrial network behavior analysis method, comprising: defining at least one first time window for a target industrial control system, wherein the first time window is used to characterize a time period for the target industrial control system to perform a corresponding control behavior; respectively determining an execution probability deviation of each control instruction in the target industrial control system within each first time window, wherein the execution probability deviation is used to characterize the fluctuation of the execution probability of the corresponding control instruction, and the execution probability is used to characterize the ratio of the number of times the corresponding control instruction is executed within a time period to the total number of times the control instruction is executed within the time period; collecting the control instruction executed in the target industrial control system; defining at least one second time window according to the collected control instruction, wherein the second time window is used to characterize a time period when the target industrial control system (30) performs the corresponding control behavior, and the control behavior performed by the target industrial control system (30) in the second time window is the same as that performed in the first time window; performing the following for each second time window: for each control instruction executed in the second time window, calculating the execution probability of the control instruction in the second time window; for each control instruction executed in the second time window, determining whether the execution probability of the control instruction meets a target execution probability deviation, wherein the target execution probability deviation is the execution probability deviation of the control instruction in the first time window corresponding to the same control behavior in the second time window; determining that the control instruction is a legal control instruction if the execution probability of the control instruction meets the target execution probability deviation; and determining that the control instruction is a suspicious control instruction if the execution probability of the control instruction does not meet the target execution probability deviation.

In some embodiments, in combination with the first aspect above, defining at least one first time window for a target industrial control system comprises: collecting the control instruction executed in the target industrial control system in a preset learning time period; when a first control instruction corresponding to the start identifier of a preset time window is collected, determining the time when the first control instruction is collected as the starting point of the time window; when a second control instruction corresponding to the end identifier of the preset time window is collected, determining the time when the second control instruction is collected as the ending point of the time window; defining the time period between each pair of sequentially adjacent starting point of the time window and ending point of the time window as a third time window; for each third time window, defining a third time window as a fourth time window if the control instruction collected in the third time window satisfies a preset complexity rule; grouping the fourth time windows to obtain at least one time window group, wherein each time window group comprises at least one fourth time window, and the target industrial control system performs the same control behavior within each of the fourth time windows comprised in the same time window group and performs different control behaviors within the fourth time windows comprised in different time window groups; and forming a corresponding first time window for each time window group, wherein the first time window and each of the fourth time windows comprised in the time window group corresponding to the first time window have the same starting point and end point of the time window, or the first time window and each of the fourth time windows comprised in the time window group corresponding to the first time window have the same time length.

In some embodiments, in combination with the first possible implementation above, determining an execution probability deviation of each control instruction in the target industrial control system within each first time window comprises: for each fourth time window, calculating the execution probability of each of the control instructions executed in the fourth time window; and performing the following for each time window group: for each control instruction executed in each of the fourth time windows comprised in the time window group, calculating the execution probability deviation of the control instruction in the first time window corresponding to the time window group according to the execution probability of the control instruction in each of the fourth time windows comprised in the time window group.

In some embodiments, in combination with the first possible implementation above, defining at least one second time window according to the collected control instruction comprises: identifying the start identifier and the end identifier of the time window from the collected control instruction; for each identified start identifier of the time window, determining the time when the control instruction corresponding to the start identifier of the time window is collected as the starting point of the time window; for each identified end identifier of the time window, determining the time when the control instruction corresponding to the end identifier of the time window is collected as the ending point of the time window; defining the time period between each determined pair of sequentially adjacent starting point of the time window and ending point of the time window as a fifth time window; and for each fifth time window, defining the fifth time window as a second time window if the control instruction collected in the fifth time window satisfies the complexity rule and there is a first time window corresponding to the same control behavior as that of the fifth time window.

In some embodiments, in combination with the third possible implementation above, after defining the time period between each determined pair of sequentially adjacent starting point of the time window and ending point of the time window as a fifth time window, the method further comprises: for each fifth time window, if the control instruction collected in the fifth time window does not satisfy the complexity rule, determining whether each control instruction executed in the fifth time window is on a preset instruction white list; if the control instruction is on the preset instruction white list, determining that the control instruction is a legal control instruction; and if the control instruction is not on the preset instruction white list, determining that the control instruction is a suspicious control instruction.

In some embodiments, in combination with the first aspect and any of the first possible implementation, second possible implementation, third possible implementation and fourth possible implementation, the control instruction comprises at least one control command sequentially executed, wherein the control command is a basic unit for device control and status feedback in the target industrial control system, and each control command may comprise at least one related parameter.

In some embodiments, an industrial network behavior analysis apparatus comprises: a first identification module, used to define at least one first time window for a target industrial control system, wherein the first time window is used to characterize a time period for the target industrial control system to perform a corresponding control behavior; a deviation calculation module, used to respectively determine an execution probability deviation of each control instruction in the target industrial control system within each first time window defined by the first identification module, wherein the execution probability deviation is used to characterize the fluctuation of the execution probability of the corresponding control instruction, and the execution probability is used to characterize the ratio of the number of times the corresponding control instruction is executed within a time period to the total number of times the control instruction is executed within the time period; an instruction collection module, used to collect the control instruction executed in the target industrial control system; a second identification module, used to define at least one second time window according to the control instruction collected by the instruction collection module, wherein the second time window is used to characterize a time period when the target industrial control system performs the corresponding control behavior, and the control behavior performed by the target industrial control system in the second time window is the same as that performed in the first time window; a probability calculation module, used to, for each second time window defined by the second identification module, calculate the execution probability of a control instruction in the second time window for each of the control instructions executed in the second time window; a probability comparison module, used to, for each second time window defined by the second identification module, for each of the control instructions executed in the second time window, determine whether the execution probability of the control instruction calculated by the probability calculation module meets a target execution probability deviation, wherein the target execution probability deviation is the execution probability deviation of the control instruction in the first time window corresponding to the same control behavior in the second time window as calculated by the deviation calculation module; a first analysis module, used to, based on the result of the probability comparison module, determine that a control instruction is a legal control instruction if the execution probability of the control instruction meets the target execution probability deviation, and that a control instruction is a suspicious control instruction if the execution probability of the control instruction does not meet the target execution probability deviation.

In some embodiments, with reference to the second aspect above, the first identification module comprises: a collecting unit, used to collect the control instruction executed in the target industrial control system in a preset learning time period; a first identification unit, used to determine the time when a first control instruction is collected as the starting point of the time window when the collecting unit collects the first control instruction corresponding to the start identifier of a preset time window, and determine the time when a second control instruction is collected as the ending point of the time window when the collecting unit collects the second control instruction corresponding to the end identifier of the preset time window; a first extraction unit, used to define the time period between each determined pair of sequentially adjacent starting point of the time window and ending point of the time window determined by the first identification unit as a third time window; a first filtering unit, used to, for each third time window defined by the first extraction unit, define a third time window as a fourth time window if the control instruction collected in the third time window satisfies a preset complexity rule; a time window grouping unit, used to group the fourth time windows defined by the first filtering unit to obtain at least one time window group, wherein each time window group comprises at least one fourth time window, and the target industrial control system performs the same control behavior within each of the fourth time windows comprised in the same time window group and performs different control behaviors within the fourth time windows comprised in different time window groups;

a time window generation unit, used to form a corresponding first time window for each time window group defined by the time window grouping unit, wherein the first time window and each of the fourth time windows comprised in the time window group corresponding to the first time window have the same starting point and end point of the time window, or the first time window and each of the fourth time windows comprised in the time window group corresponding to the first time window have the same time length.

In some embodiments, in combination with the first possible implementation above, the deviation calculation module comprises: a probability calculation unit, used to, for each time window group, respectively calculate the execution probability of each of the control instructions executed in each of the fourth time windows comprised in the time window group; a deviation calculation unit, used to, for each time window group, for each control instruction executed in each of the fourth time windows comprised in the time window group, calculate the execution probability deviation of the control instruction in the first time window corresponding to the time window group according to the execution probability of the control instruction in each of the fourth time windows comprised in the time window group as calculated by the probability calculation unit.

In some embodiments, in combination with the first possible implementation above, the second identification module comprises: a second identification unit, used to identify the start identifier and the end identifier of the time window from the collected control instruction; a starting point determination unit, used to, for each identified start identifier of the time window identified by the second identification unit, determine the time when the control instruction corresponding to the start identifier of the time window is collected as the starting point of the time window; an ending point determination unit, used to, for each identified end identifier of the time window identified by the second identification unit, determine the time when the control instruction corresponding to the end identifier of the time window is collected as the ending point of the time window; a second extraction unit, used to define the time period between each pair of sequentially adjacent starting point of the time window and ending point of the time window determined by the starting point determination unit and the ending point determination unit as a fifth time window; and a second filtering unit, used to, for each fifth time window defined by the second extraction unit, define the fifth time window as a second time window if the control instruction collected in the fifth time window satisfies the complexity rule and there is a first time window corresponding to the same control behavior as that of the fifth time window.

In some embodiments, in combination with the third possible implementation above, the industrial network behavior analysis apparatus further comprises: a second analysis module; the second analysis module is used to, for each fifth time window defined by the second extraction unit, if the control instruction collected in the fifth time window does not satisfy the complexity rule, determine whether each control instruction executed in the fifth time window is on a preset instruction white list, and that a control instruction is a legal control instruction if the control instruction executed in the fifth time window is on the instruction white list and a control instruction is a suspicious control instruction if the control instruction executed in the fifth time window is not on the instruction white list.

In some embodiments, in combination with the second aspect and any of the first possible implementation, second possible implementation, third possible implementation and fourth possible implementation of the second aspect above, the control instruction comprises at least one control command sequentially executed, wherein the control command is a basic unit for device control and status feedback in the target industrial control system, and each control command may comprise at least one related parameter.

In some embodiments, an industrial network behavior analysis apparatus, comprising: at least one memory and at least one processor; wherein the at least one memory is used to store a machine-readable program; and the at least one processor is used to call the machine-readable program to execute one or more of the methods described herein.

In some embodiments, there is an industrial network behavior analysis system comprising: an industrial network behavior analysis apparatus described herein and at least one industrial control system.

In some embodiments, there is a computer-readable medium, which stores a computer instruction that, when executed by a processor, causes the processor to perform one or more of the methods described herein.

In some embodiments, at least one first time window is determined for a target industrial control system, so that different first time windows represent the time periods when the target industrial control system performs different control behaviors, and the execution probability deviations of the control instructions executed in each first time window are determined respectively, so that the execution probability deviation is used to characterize the fluctuation of the execution probability of a corresponding control instruction when the target industrial control system performs the corresponding control behavior at different times.

Since the target industrial control system follows the same execution rule for each control instruction when performing the same control behavior and the execution probability of each control instruction remains stable, a second time window can be determined according to the types of control instructions collected and the related parameters comprised therein, thereby determining whether each control instruction of the target industrial control system is legal in the process of performing the corresponding control behavior based on whether the execution probability of each control instruction executed in the second time window meets the execution probability deviation of the same control instruction in the corresponding first time window, for the analysis of industrial network behaviors.

Detailed Description of the Embodiments

As mentioned previously, in order to ensure the security of an OT network comprising a security monitoring system and industrial control systems, the control instructions among the control devices in an industrial control system may be collected, and then the industrial network behavior may be analyzed by use of the collected control instructions, wherein industrial network behaviors include control instructions, collection of industrial status, transmission of industrial data, etc., to determine whether the OT network is at risk of malicious attacks. At present, for the analysis of industrial network behaviors, a trust list recording legal control instructions is created in advance.

After control instructions are collected from an industrial control system, it is determined whether a collected control instruction is recorded in the trust list. If a collected control instruction is recorded in the trust list, it is determined that the collected control instruction is a legal one. If not, it is determined that it is an abnormal control instruction, and that the OT network is at risk of malicious attacks. The analysis of industrial network behaviors in the form of a pre-created trust list (white list) is only applicable to simple control processes with a relatively small number of control instructions. For complex control processes, it is difficult to create the corresponding trust list, and thus the analysis method of industrial network behaviors based on a trust list is not applicable. Therefore, the applicability of the existing industrial network behavior analysis method is poor.

In some embodiments, at least one first time window is defined for a target industrial control system, so that each first time window is used to characterize the time period for the target industrial control system to perform the corresponding control behavior. The execution probability deviation of each control instruction in each first time window is determined, so that the execution probability deviation is used to characterize the fluctuation of the execution probability of the corresponding control instruction in the first time window. After that, control instructions executed by the target control system during its operation are collected, and at least one second time window corresponding to the same control behavior as that of the first time window is defined according to the collected control instructions.

Then, the execution probability of each control instruction in each second time window is calculated, and it is determined whether the execution probability of each control instruction in the second time window meets the execution probability deviation of the control instruction in the first time window. A control instruction is determined to be a legal control instruction if the execution probability of the control instruction meets the execution probability deviation of the control instruction in the corresponding first time window, and a control instruction is determined to be a suspicious control instruction if the execution probability of the control instruction does not meet the execution probability deviation of the control instruction in the corresponding first time window.

It can be seen that, when first time windows and the execution probability deviations of the corresponding control instructions are created in advance, control instruction are collected during the operation of industrial control systems to define second time windows corresponding to the same control behaviors as those of the first time windows, thus determining whether the execution probabilities of the control instructions executed in the second time windows meet the execution probability deviations of the same control instructions in the corresponding first time windows, and the security of each control instruction is determined by comparing the execution probability of each control instruction when an industrial control system performs the same control behavior, the applicability to security analysis of control instructions can be improved because the appropriate first time windows and second time windows can be obtained for both simple and complex control processes to analyze the security of control instructions.

The industrial network behavior analysis method, apparatus and system provided by the embodiments of the present invention are described in detail below with reference to the drawings. As shown in FIG. 1, the embodiments of the present invention provide an industrial network behavior analysis method, which may comprise the following steps:

Step 101: defining at least one first time window for a target industrial control system, wherein the first time window is used to characterize a time period for the target industrial control system to perform a corresponding control behavior;

Step 102: respectively determining an execution probability deviation of each control instruction in the target industrial control system within each first time window, wherein the execution probability deviation is used to characterize the fluctuation of the execution probability of the corresponding control instruction, and the execution probability is used to characterize the ratio of the number of times the corresponding control instruction is executed within a time period to the total number of times the control instruction is executed within the time period;

Steps 103: collecting control instructions executed in the target industrial control system;

Step 104: defining at least one second time window according to the collected control instruction, wherein the second time window is used to characterize a time period when the target industrial control system performs the corresponding control behavior, and the control behavior performed by the target industrial control system in the second time window is the same as that performed in the first time window;

Step 105: for each second time window, for each control instruction executed in the second time window, calculating the execution probability of the control instruction in the second time window;

Step 106: for each second time window, for each control instruction executed in the second time window, determining whether the execution probability of the control instruction meets a target execution probability deviation, performing Step 107 if yes, Y, and performing Step 108 if no, N, wherein the target execution probability deviation is the execution probability deviation of the control instruction in the first time window corresponding to the same control behavior in the second time window;

Step 107: determining that the control instruction is a legal control instruction, and ending the current process;

Step 108: determining that the control instruction is a suspicious control instruction.

In some embodiments, Steps 101 and 102 are performed first, i.e., the first time windows and the execution probability deviations of different control instructions in each first time window need to be determined in advance for the target industrial control system, or Steps 101 and 102 are the learning stage of the basis for subsequent decisions. Steps 103 to 108 are performed subsequently, i.e., performed periodically in the normal process of the target industrial control system, or Steps 103 to 108 are stages of testing the security of control instructions.

In some embodiments, at least one first time window is determined for a target industrial control system, so that different first time windows represent the time periods when the target industrial control system performs different control behaviors, and the execution probability deviations of the control instructions executed in each first time window are determined respectively, so that the execution probability deviation is used to characterize the fluctuation of the execution probability of a corresponding control instruction when the target industrial control system performs the corresponding control behavior at different times.

Since the target industrial control system follows the same execution rule for each control instruction when performing the same control behavior and the execution probability of each control instruction remains stable, a second time window can be determined according to the types of control instructions collected and the related parameters comprised therein, thereby determining whether each control instruction of the target industrial control system is legal in the process of performing the corresponding control behavior based on whether the execution probability of each control instruction executed in the second time window meets the execution probability deviation of the same control instruction in the corresponding first time window, for the analysis of control instructions.

In some embodiments, the number of the first time windows depends on the control behaviors that the target industrial control system can perform. Generally, the number of the first time windows is less than or equal to that of the control behaviors that the target industrial control system can perform. For example, the target industrial control system is used to control the operation of an automobile production line. Every day is a production cycle, wherein the period from 8:00 to 12:00 is used to control the production line for manufacturing model A cars, that from 12:00 to 14:00 is the period when the production line pauses, that from 14:00 to 19:00 is used to control the production line for manufacturing model B cars, and that from 19:00 to 8:00 the next day is the period when the production line pauses. In this case, the control of the production line for manufacturing model A cars and the control of the production line for manufacturing model B cars by the target industrial control system may be taken as two different control behaviors, and the control of the production line to pause by the target industrial control system may also be taken as a control behavior. Thus, two first time windows can be determined, i.e., first time window 1 corresponding to the period from 8:00 to 12:00, and first time window 2 corresponding to the period from 14:00 to 19:00.

In some embodiments, since the first time windows correspond to the control behaviors of the target industrial control system and the target industrial control system needs the same or different time lengths to perform different control behaviors, different first time windows may have different time lengths or the same time length. Correspondingly, different second time windows may have different time lengths or the same time length.

In some embodiments, Step 103 collects the control instructions executed in the target industrial control system, which is usually performed in real time to ensure the accuracy in determining the second time windows according to the collected control instructions, thereby ensuring the accuracy of the security analysis of the control instructions based on the second time windows and the first time windows.

In some embodiments, both the second time window and the first time window are used to characterize the time periods when the target industrial control system performs corresponding control behaviors, and for each second time window, the control behaviors performed by the target industrial control system in the second time window are the same as those performed by the target industrial control system in one of the first time windows. For example, if the target industrial control system performs control behavior A in a second time window X, there will be a first time window Y, the target industrial control system also performs control behavior A in the first time window Y, and the second time window X corresponds to the first time window Y. In addition, since the target industrial control system may repeatedly perform the same control behavior, a plurality of second time windows may correspond to the same first time window among the defined second time windows, i.e., the control behaviors performed by the target industrial control system in a plurality of second time windows are the same as the control behavior performed by the target industrial control system in the same first time window.

Figure 2:
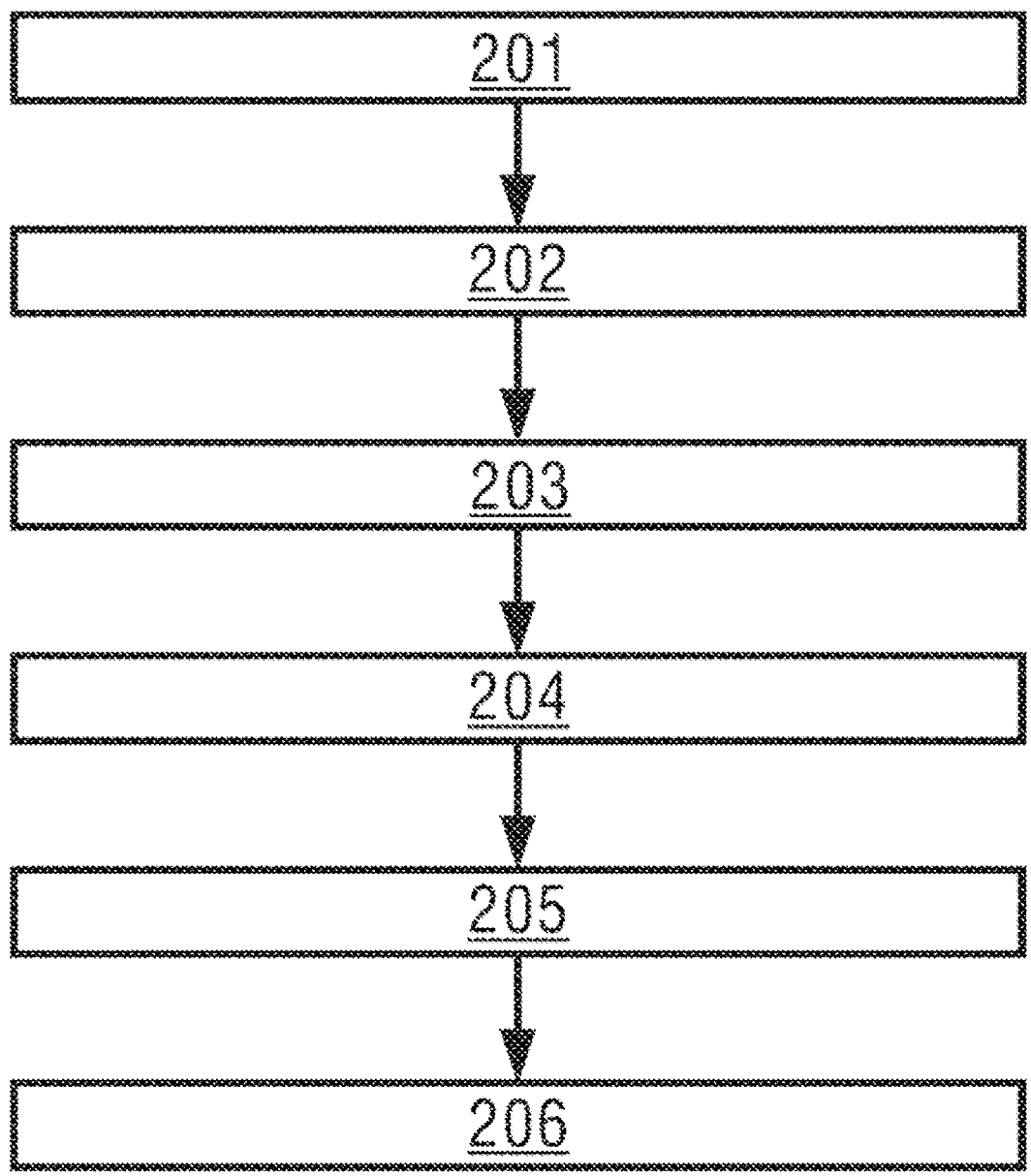
FIG. 2 is a flowchart of a method for defining a first time window incorporating teachings of the present disclosure.

In some embodiments, on the basis of the industrial network behavior analysis method shown in FIG. 1, the learning time period when the target industrial control system has no illegal or suspicious control instructions can be determined, and the first time windows can be defined by collecting the control instructions executed in the target industrial control system during the learning time period. As shown in FIG. 2, the method for defining the first time windows may comprise the following steps:

Step 201: collecting control instructions executed in the target industrial control system in a preset learning time period;

Step 202: when a first control instruction corresponding to the start identifier of a preset time window is collected, determining the time when the first control instruction is collected as the starting point of the time window; when a second control instruction corresponding to the end identifier of the preset time window is collected, determining the time when the second control instruction is collected as the ending point of the time window;

Step 203: defining the time period between each pair of sequentially adjacent starting point of the time window and ending point of the time window as a third time window;

Step 204: for each third time window, defining a third time window as a fourth time window if the control instruction collected in the third time window satisfies a preset complexity rule;

Step 205: grouping the fourth time windows to obtain at least one time window group, wherein each time window group comprises at least one fourth time window, and the target industrial control system performs the same control behavior within each of the fourth time windows comprised in the same time window group and performs different control behaviors within the fourth time windows comprised in different time window groups;

Step 206: forming a corresponding first time window for each time window group, wherein the first time window and each of the fourth time windows comprised in the time window group corresponding to the first time window have the same starting point and end point of the time window, or the first time window and each of the fourth time windows comprised in the time window group corresponding to the first time window have the same time length.

In some embodiments, since the execution probability of each control execution of the target industrial control system is stable when the system performs the same control behavior, the control instructions executed by the target industrial control system when performing each control behavior can be collected for a period of time, the fourth time window corresponding to each control behavior can be identified through the collected control instructions, and all the fourth time windows corresponding to the same control behavior are grouped into the same time window group. Then a corresponding first time window is generated for each time window group, thereby the first time window can be used as a benchmark to determine the security of each control instruction when the target industrial control system performs the corresponding control behavior.

In some embodiments, the length of the learning time period can be determined based on the number of the control behaviors performed by the target industrial control system and the time span of each control behavior. Generally, the more control behaviors performed by the target industrial control system, the longer the learning time period, and the longer the time span of each control behavior, the longer the learning time period. For example, when the length of the learning time period is set to one month, the control instructions of the target industrial control system will be collected within the preset one month period, and then the first time windows will be defined according to the control instructions collected within this month.

In some embodiments, for the first time windows to correspond to the control behaviors of the target industrial control system, the start identifier and the end identifier of a time window corresponding to each control behavior may be defined in advance for the target industrial control system, so that the start identifier of the time window corresponds to the control instruction executed by the target industrial control system when the corresponding control behavior starts, and the end identifier of the time window corresponds to the control instruction executed by the target industrial control system when the corresponding control behavior ends, thereby determining the corresponding third time window by detecting the start identifier and end identifier of the time window.

The start identifier of a time window may be a write instruction, a start or stop instruction, one or more diagnostic instructions, one or more read instructions, one or more read instructions with specific parameters, specific diagnostic information that can be excluded, or a command sequence that includes a plurality of write or read instructions. The end identifier of a time window may be information that there is no valid instruction or a specific instruction sequence or information in one or more monitoring cycles. For example, the end identifier of a time window may be the generation of a stop instruction or device restart instruction.

The time when the start identifier of a time window is collected is taken as the starting point of the time window, and the time when the end identifier of a time window is collected is taken as the ending point of the time window. After a series of the starting points and the end points of time windows is obtained, the time period between a pair of sequentially adjacent starting point and ending point of a time window is determined as a third time window, thereby completing the conversion from a control behavior to the third time window, and converting each control task executed by the target industrial control system during the learning time period into a corresponding third time window.

In some embodiments, after each third time window is defined, it can be checked whether the control instructions collected in each third time window meet a preset complexity rule. If the control instructions collected in a third time window meet the complexity rule, the third time window is determined as a fourth time window. If the control instructions collected in a third time window do not meet the complexity rule, the control instructions collected in the third time window may be stored in a instruction white list, and the third time window is not taken as a fourth time window.

The complexity rule is set in advance, and each third time window obtained is filtered through the complexity rule. Only the third time windows that satisfy the complexity rule are determined as fourth time windows, so that the fourth time windows correspond to complex control behaviors. The control instructions in the third time windows that do not satisfy the complexity rule are stored in the white list. Thus, the security of control instructions for complex control behaviors is analyzed based on time windows and the execution probability deviation, while the security of control instructions for simple control behaviors is analyzed based on the white list, which can not only save computing resources, but also prevent control instructions corresponding to simple control behaviors from becoming the interference noise for control instructions corresponding to complex control behaviors, thus ensuring the accuracy of industrial network behavior analysis for complex control behaviors.

The complexity rule may be defined as a rule that a corresponding time window comprises at least two different control instructions, the same control instruction comprises different parameters, or the control instructions are the same during a relatively long time period.

In some embodiments, since the same control behavior may be performed by the target industrial control system for a plurality of times during the learning time period, it is necessary to group the defined fourth time windows to divide all the fourth time windows corresponding to the same control behavior into the same time window group, and then the corresponding first time window can be formed for each time window group, so that each first time window corresponds to a control behavior.

For grouping the fourth time windows, different fourth time windows have different index identifiers, and the first few control instructions executed in a fourth time window will be stored as characteristic values, so that each fourth time window can be grouped according to the index identifier and characteristic value of each fourth time window, thereby grouping the fourth time windows corresponding to the same control behavior into the same time window group.

In some embodiments, for each time window group divided, a corresponding first time window is generated according to each fourth time window in the time window group, so that the generated first time windows can reflect the starting time or time span of each fourth time window in the corresponding time window group in general. Depending on the specific business scenario, different fourth time windows corresponding to the same control behavior may have a relatively stable starting time or a relatively stable time span. When different fourth time windows corresponding to the same control behavior have a relatively stable starting time, the first time window can be generated according to the starting time of each fourth time window in a time window group. For example, time window group 1 comprises three fourth time windows, the corresponding starting times of the three fourth time windows are 8:00-12:00, 8:05-12:06, and 8:02-12:05, respectively, and the first time window corresponding to the starting time of 8:00-12:00 can be generated, which corresponds to time window group 1.

When different fourth time windows corresponding to the same control behavior have a relatively stable time span, the first time window can be generated according to the time span of each fourth time window in a time window group. For example, time window group 2 comprises four fourth time windows, the corresponding starting times of the four fourth time windows are 14:00-19:00, 13:00-18:00, 14:30-19:30, and 13:30-18:30, respectively, and the first time window corresponding to a time span of 5 hours can be generated, which corresponds to time window group 2.

Depending on the actual business scenario, the starting time and the time span of a generated first time window may be different from each fourth time window in the corresponding time window group, especially the starting time, and the time spans usually have small differences. For generating the first time windows, the time span of a first time window may be equal to the average of the time spans of all the fourth time windows in the corresponding time window group, and the starting time of the first time window may be equal to the average of the starting times of all the fourth time windows in the corresponding time window group.

In some embodiments, when the control instructions executed in the target industrial control system are collected, the flow of the target industrial control system may be intercepted, and then the control instructions can be extracted from the intercepted flow according to a preset control instruction extraction rule. Specifically, probes (sensors) may be provided in the target industrial control system to intercept the flow from the access switch and system bus in the target industrial control system, wherein the system bus is used to connect PLCs to engineer stations and operator stations, and the access switch is used to connect the operation center to engineer stations and operator stations. In addition, control commands and related parameters in the control commands can be extracted from the intercepted flow by setting a control instruction extraction rule, i.e., a control instruction consists of one or more control commands and related parameters. It should be noted that the method for collecting control instructions in Step 103 is the same as that in the embodiments of the present invention, i.e., the flow can be intercepted from the access switch and the system bus of the target industrial control system, and then control instructions can be extracted from the intercepted flow.

It should be noted that a first time window and each fourth time window comprised in the time window group window group corresponding to the first time window have the same starting point and ending point of the time window. The same starting point and ending point of a time window do not mean that the first time window and the fourth time window have the same starting time and ending time, but that the difference between the starting times of the first time window and the fourth time window is less than a preset threshold, and the difference between the ending times of the first time window and the fourth time window is less than a preset threshold.

In addition, the starting point and the ending point of a time window are not the absolute time points, but rather the relative time points in the corresponding cycle, for example, time points in each day. Accordingly, a first time window and each fourth time window comprised in the time window group window group corresponding to the first time window have the same time length. The same time length does not mean that the first time window and the fourth time window have the same length, but that the difference between the time lengths of the first time window and the fourth time window is less than a preset threshold.

Figure 3:
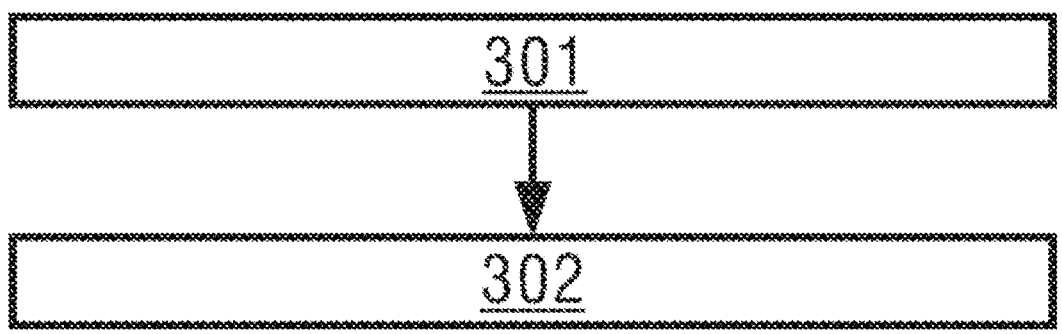
FIG. 3 is a flowchart of a method for calculating the execution probability deviation incorporating teachings of the present disclosure.

In some embodiments, on the basis of the method for defining first time windows shown in FIG. 2, the execution probability deviation of each control instruction in the corresponding first time window may be determined based on the execution probability of each control instruction executed in each fourth time window within the time window group. As shown in FIG. 3, the method for determining the execution probability deviation of each control instruction in a first time window may comprise the following steps:

Step 301: for each fourth time window, calculating the execution probability of each of the control instructions executed in the fourth time window;

Step 302: for each time window group, for each control instruction executed in each of the fourth time windows comprised in the time window group, calculating the execution probability deviation of the control instruction in the first time window corresponding to the time window group according to the execution probability of the control instruction in each of the fourth time windows comprised in the time window group.

In some embodiments, after all the fourth time windows are divided into a plurality of time window groups, for each fourth time window in each time window group, the execution probability of each control instruction executed in the fourth time window can be calculated. The execution probability is used to characterize the probability that the corresponding control instruction is executed in a period of time. Specifically, the execution probability of a control instruction in a period of time is equal to the ratio of the number of times the control instruction is executed in the period of time to the total number of times all control instructions are executed in the period of time. For example, in a fourth time window, the target industrial control system has executed 100 control instructions in total, of which control instruction A has been executed 20 times in the fourth time window, and then the execution probability of control instruction A in the fourth time window is 20%.

In some embodiments, for each time window group, for each control instruction executed in each fourth time window comprised in the time window group, the execution probability deviation of the control instruction in the first time window corresponding to the time window group is calculated according to the execution probability of the control instruction in each fourth time window comprised in the time window group. Since the execution probability of each control instruction executed by the target industrial control system is essentially stable when it performs the same control behavior at different times, the execution probability deviation of a control instruction is used to characterize the allowable fluctuation range of the control instruction when the target industrial control system performs the corresponding control behavior.

To calculate the execution probability deviation according to the probability of control instructions executed in different fourth time windows, different methods may be used to calculate the execution probability deviation depending on the actual application scenario. For example, the difference between the maximum execution probability and the minimum execution probability of a control instruction may be taken as the execution probability deviation of the control instruction, and the execution probability deviation may also be obtained by calculating the normal distribution of the execution probabilities of a control instruction in different fourth time windows. For example, time window group 1 comprises three fourth time windows, the probabilities of control instruction A executed in these three fourth time windows are 20%, 21% and 19% respectively, and the difference between the maximum execution probability of control instruction A, i.e., 21%, and the minimum execution probability, i.e., 19%, is 2%, which is taken as the execution probability deviation of control instruction A in the first time window corresponding to time window group 1.

In some embodiments, to determine whether the execution probability of a control instruction meets a target execution probability deviation, the average execution probability of the control instruction in the corresponding first time window may be determined in advance, and then it can be determined whether the difference between the execution probability and the average execution probability of the control instruction is less than the target execution probability deviation. If yes, it can be determined that the execution probability of the control instruction meets the target execution probability deviation, otherwise, it is determined that the execution probability of the control instruction does not meet the target execution probability deviation. The average execution probability of a control instruction is equal to the average of the execution probabilities of the control instruction in all the fourth time windows comprised in the corresponding time window group.

Figure 4:
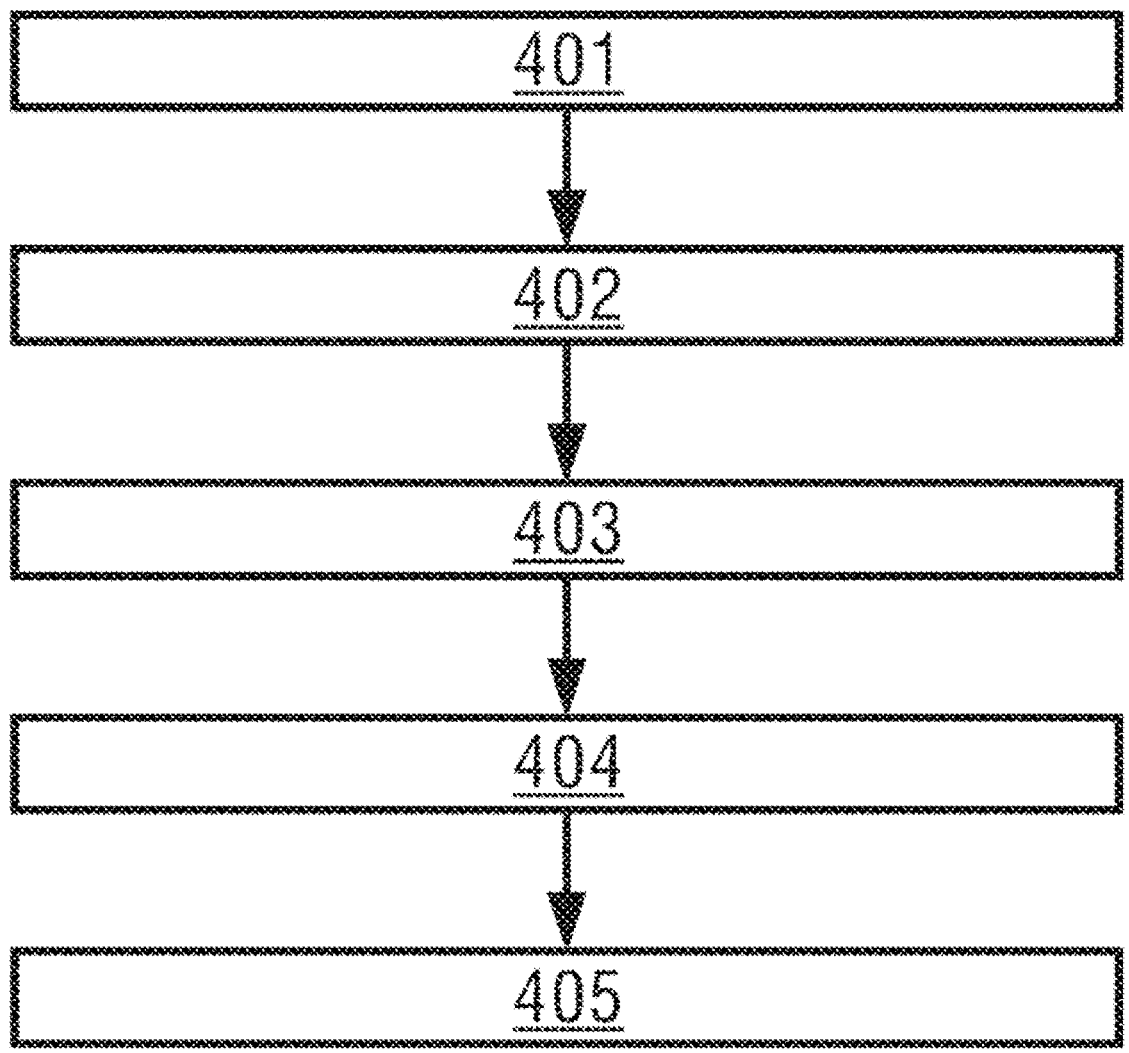
FIG. 4 is a flowchart of a method for defining a second time window incorporating teachings of the present disclosure.

In some embodiments, on the basis of the method for defining first time windows shown in FIG. 2, the second time window may be defined based on the start identifier and end identifier of a time window used to define the first time window. As shown in FIG. 4, the method for defining the second time windows may comprise the following steps:

Step 401: identifying the start identifier and the end identifier of the time window from the collected control instruction;

Step 402: for each identified start identifier of the time window, determining the time when the control instruction corresponding to the start identifier of the time window is collected as the starting point of the time window;

Step 403: for each identified end identifier of the time window, determining the time when the control instruction corresponding to the end identifier of the time window is collected as the ending point of the time window;

Step 404: defining the determined time period between each pair of sequentially adjacent starting point of the time window and ending point of the time window as a fifth time window;

Step 405: for each fifth time window, defining the fifth time window as a second time window if the control instruction collected in the fifth time window satisfies the complexity rule and there is a first time window corresponding to the same control behavior as that of the fifth time window.

In some embodiments, the start identifier and end identifier of a time window used to define a first time window are used to identify the start identifier and end identifier of a time window from the control instructions collected in the detection process. The time when the start identifier of a time window is collected is determined as the starting point of the time window, and the time when the end identifier of a time window is collected is determined as the ending point of the time window. Then, the time period between each pair of sequentially adjacent starting point and ending point of a time window is determined as a fifth time window, and then second time windows are selected from the fifth time windows. By use of the time window identifiers as a single basis, it can be ensured that the second time windows corresponding to the first time windows can be obtained, thus ensuring that the security analysis of control instructions can be carried out normally.

In some embodiments, after a fifth time window is obtained, it is firstly determined whether the control instructions collected in the fifth time window meet the complexity rule. If the control instructions collected in the fifth time window do not meet the complexity rule, it means that the target industrial control system performs a simple control behavior in the fifth time window, and it can be determined whether the control instructions collected in the fifth time window are legal based on the white list, to prevent the waste of computing resources. If the control instructions collected in the fifth time window meet the complexity rule, it is further determined whether there is a first time window where the control behavior performed by the target industrial control system is the same as the control behavior performed by the target industrial control system in the fifth time window. If there is a first time window meeting the above condition, the fifth time window is determined as a second time window to perform subsequent processing. If there is no first time window meeting the above condition, it means that the target industrial control system has performed a control behavior that has not been performed before, and then it is determined that all control instructions collected in the fifth time window are suspicious control instructions.

In some embodiments, on the basis of the method for defining second time windows shown in FIG. 4, after the fifth time windows are defined in Step 404, if the control instructions collected in a defined fifth time window do not meet the complexity rule, it is determined whether each control instruction executed in the fifth time window is in the preset instruction white list, and if so, it is determined that the control instruction is a legal control instruction, otherwise, it is determined that the control instruction is a suspicious control instruction.

In some embodiments, for the fifth time window that does not satisfy the complexity rule, the control instructions collected in the fifth time window are analyzed for security based on the preset instruction white list, and it is determined whether each control instruction executed in the fifth time window is recorded in the instruction white list. If yes, it is determined that the control instruction is a legal control instruction, otherwise, it is determined that the control instruction is a suspicious control instruction. For simple control behaviors performed by the target industrial control system, the instruction white list can be easily created, and then security of the control instructions executed by the target industrial control system in the process of performing simple control behaviors can be analyzed based on the created instruction white list, thus preventing the waste of computing resources that would be used for calculating the execution probability for security analysis.

In some embodiments, on the basis of the industrial network behavior analysis provided by the above embodiments, a control instruction may be a single control command or a control command sequence comprising a plurality of control commands. A control command is the basic unit for device control and status feedback in the target industrial control system, and each control command may comprise one or more related parameters.

In some embodiments, according to the specific business scenario, a single control command may be collected from the target industrial control system as a control instruction, or a sequence of control commands may be collected from the target industrial control system as a control instruction, and a control instruction may also comprise related parameters, thus making it possible to be applied to different application scenarios, and further improving the applicability of the industrial network behavior analysis method.

In some embodiments, a control instruction may be any one of a write command, a read command, a start command, diagnostic information, a heartbeat signal, etc., or a sequential combination of any two or more of a write command, a read command, a start command, diagnostic information, a heartbeat signal, etc., and the key parameters transmitted in the target industrial control system may also be used as control instructions.

In some embodiments, on the basis of the industrial network behavior analysis method provided by the above embodiments, in the process of defining the first time windows and the second time windows, a collected control instruction may be converted into a corresponding digital sequence by preset conversion rules, and then the converted digital sequence may be used to calculate the execution probability and the execution probability deviation of the corresponding control instruction, so that the calculation of the execution probability, the calculation of the execution probability deviation and the matching between the first time windows and the second time windows are more convenient and faster, and the computing resources required for the industrial network behavior analysis can be reduced.

Figure 5:
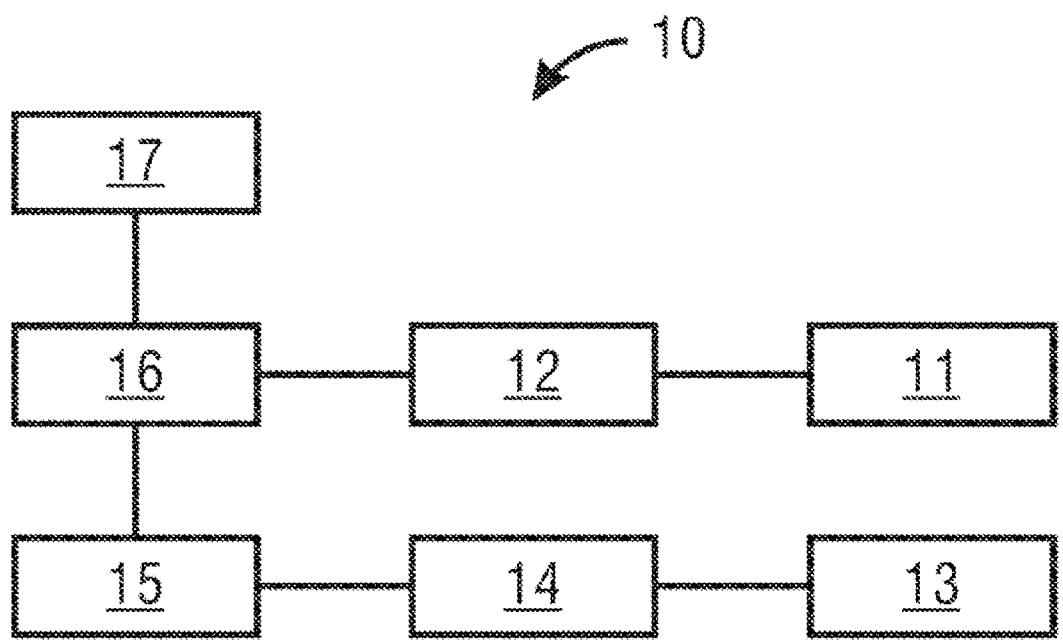
FIG. 5 is a schematic diagram of an industrial network behavior analysis apparatus incorporating teachings of the present disclosure.

As shown in FIG. 5, one embodiment of the present invention provides an industrial network behavior analysis apparatus 10, comprising: a first identification module 11, used to define at least one first time window for a target industrial control system, wherein the first time window is used to characterize a time period for the target industrial control system to perform a corresponding control behavior; a deviation calculation module 12, used to respectively determine an execution probability deviation of each control instruction in the target industrial control system within each first time window defined by the first identification module 11, wherein the execution probability deviation is used to characterize the fluctuation of the execution probability of the corresponding control instruction, and the execution probability is used to characterize the ratio of the number of times the corresponding control instruction is executed within a time period to the total number of times the control instruction is executed within the time period; an instruction collection module 13, used to collect the control instruction executed in the target industrial control system; a second identification module 14, used to define at least one second time window according to the control instruction collected by the instruction collection module 13, wherein the second time window is used to characterize a time period when the target industrial control system performs the corresponding control behavior, and the control behavior performed by the target industrial control system in the second time window is the same as that performed in the first time window; a probability calculation module 15, used to, for each second time window defined by the second identification module 14, calculate the execution probability of a control instruction in the second time window for each of the control instructions executed in the second time window; a probability comparison module 16, used to, for each second time window defined by the second identification module 14, for each of the control instructions executed in the second time window, determine whether the execution probability of the control instruction calculated by the probability calculation module 15 meets a target execution probability deviation, wherein the target execution probability deviation is the execution probability deviation of the control instruction in the first time window corresponding to the same control behavior in the second time window as calculated by the deviation calculation module 12; and a first analysis module 17, used to, based on the result of the probability comparison module 16, determine that a control instruction is a legal control instruction if the execution probability of the control instruction meets the target execution probability deviation, and that a control instruction is a suspicious control instruction if the execution probability of the control instruction does not meet the target execution probability deviation.

In some embodiments, the first identification module 11 may be used to perform Step 101 in the method embodiments above, the deviation calculation module 12 may be used to perform Step 102 in the method embodiments above, the instruction collection module 13 may be used to perform Step 103 in the method embodiments above, the second identification module 14 may be used to perform Step 104 in the method embodiments above, the probability calculation module 15 may be used to perform Step 105 in the method embodiments above, the probability comparison module 16 may be used to perform Step 106 in the method embodiments above, and the first analysis module 17 may be used to perform Step 107 and Step 108 in the method embodiments above.

Figure 6:
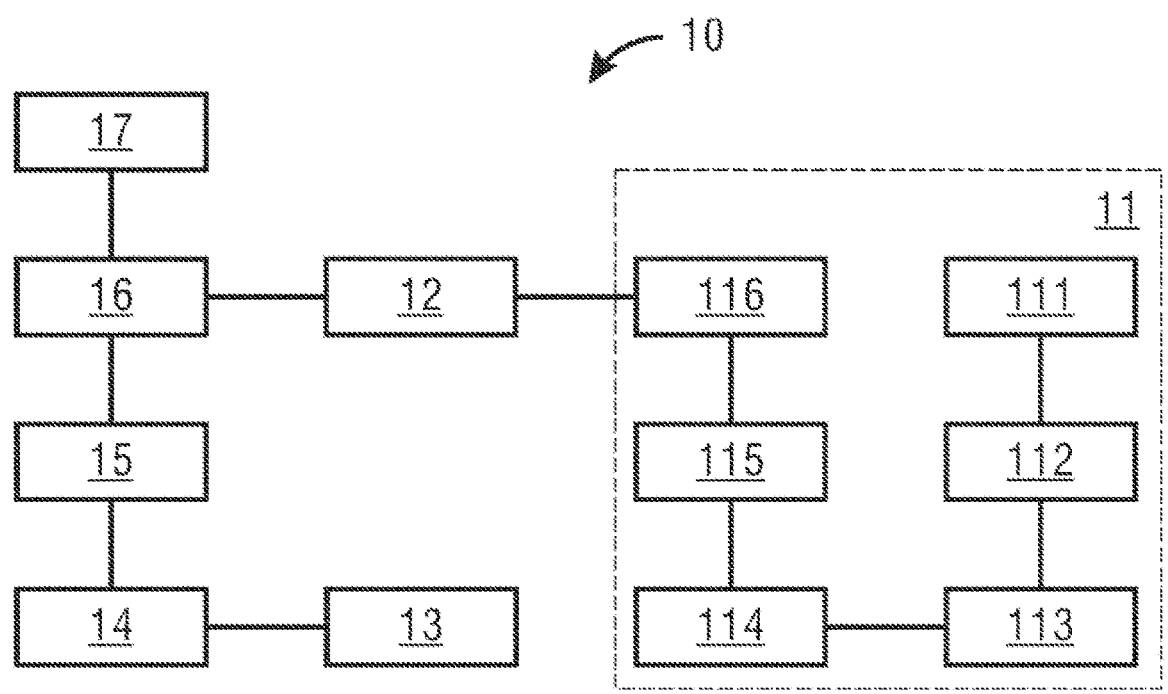
FIG. 6 is a schematic diagram of another industrial network behavior analysis apparatus incorporating teachings of the present disclosure.

In some embodiments, on the basis of the industrial network behavior analysis apparatus 10 shown in FIG. 5, as shown in FIG. 6, the first identification module 11 comprises: a collecting unit 111, used to collect the control instruction executed in the target industrial control system in a preset learning time period; a first identification unit 112, used to determine the time when a first control instruction is collected as the starting point of the time window when the collecting unit 111 collects the first control instruction corresponding to the start identifier of a preset time window, and determine the time when a second control instruction is collected as the ending point of the time window when the collecting unit 111 collects the second control instruction corresponding to the end identifier of the preset time window; a first extraction unit 113, used to define the time period between each determined pair of sequentially adjacent starting point of the time window and ending point of the time window determined by the first identification unit 112 as a third time window; a first filtering unit 114, used to, for each third time window defined by the first extraction unit 113, define a third time window as a fourth time window if the control instruction collected in the third time window satisfies a preset complexity rule; a time window grouping unit 115, used to group the fourth time windows defined by the first filtering unit 114 to obtain at least one time window group, wherein each time window group comprises at least one fourth time window, and the target industrial control system performs the same control behavior within each of the fourth time windows comprised in the same time window group and performs different control behaviors within the fourth time windows comprised in different time window groups; and a time window generation unit 116, used to form a corresponding first time window for each time window group defined by the time window grouping unit 115, wherein the first time window and each of the fourth time windows comprised in the time window group corresponding to the first time window have the same starting point and end point of the time window, or the first time window and each of the fourth time windows comprised in the time window group corresponding to the first time window have the same time length.

In some embodiments, the collecting unit 111 may be used to perform Step 201 in the method embodiments above, the first identification unit 112 may be used to perform Step 202 in the method embodiments above, the first extraction unit 113 may be used to perform Step 203 in the method embodiments above, the first filtering unit 114 may be used to perform Step 204 in the method embodiments above, the time window grouping unit 115 may be used to perform Step 205 in the method embodiments above, and the time window generation unit 116 may be used to perform Step 206 in the method embodiments above.

Figure 7:
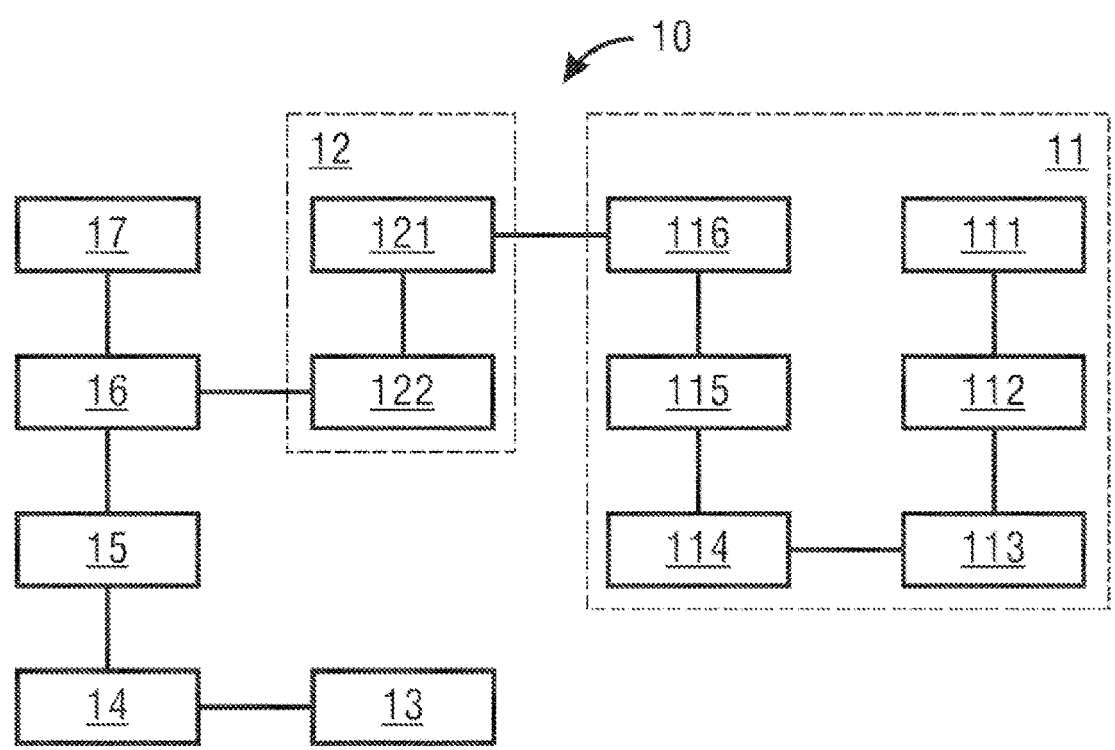
FIG. 7 is a schematic diagram of yet another industrial network behavior analysis apparatus incorporating teachings of the present disclosure.

In some embodiments, on the basis of the industrial network behavior analysis apparatus 10 shown in FIG. 6, as shown in FIG. 7, the deviation calculation module 12 comprises: a probability calculation unit 121, used to, for each time window group, respectively calculate the execution probability of each of the control instructions executed in each of the fourth time windows comprised in the time window group; and a deviation calculation unit 122, used to, for each time window group, for each control instruction executed in each of the fourth time windows comprised in the time window group, calculate the execution probability deviation of the control instruction in the first time window corresponding to the time window group according to the execution probability of the control instruction in each of the fourth time windows comprised in the time window group as calculated by the probability calculation unit 121.

In some embodiments, the probability calculation unit 121 may be used to perform Step 301 in the method embodiments above, and the deviation calculation unit 122 may be used to perform Step 302 in the method embodiments above.

Figure 8:
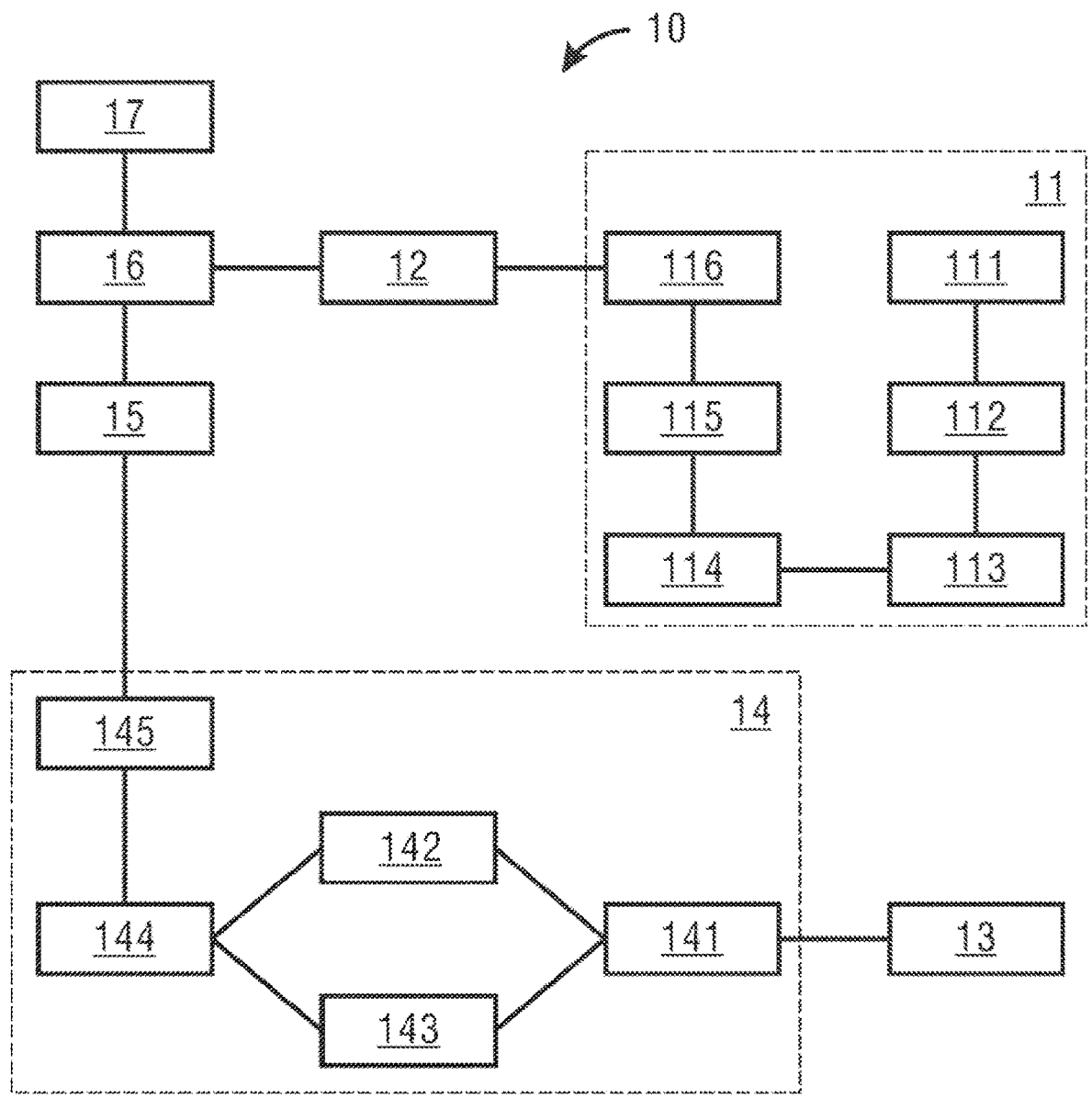
FIG. 8 is a schematic diagram of still another industrial network behavior analysis apparatus incorporating teachings of the present disclosure.

In some embodiments, on the basis of the industrial network behavior analysis apparatus 10 shown in FIG. 6, as shown in FIG. 8, the second identification module 14 comprises: a second identification unit 141, used to identify the start identifier and the end identifier of the time window from the collected control instruction; a starting point determination unit 142, used to, for each identified start identifier of the time window identified by the second identification unit 141, determine the time when the control instruction corresponding to the start identifier of the time window is collected as the starting point of the time window; an ending point determination unit 143, used to, for each identified end identifier of the time window identified by the second identification unit 141, determine the time when the control instruction corresponding to the end identifier of the time window is collected as the ending point of the time window; a second extraction unit 144, used to define the time period between each pair of sequentially adjacent starting point of the time window and ending point of the time window determined by the starting point determination unit 142 and the ending point determination unit 143 as a fifth time window; and a second filtering unit 145, used to, for each fifth time window defined by the second extraction unit 144, define the fifth time window as a second time window if the control instruction collected in the fifth time window satisfies the complexity rule and there is a first time window corresponding to the same control behavior as that of the fifth time window.

In some embodiments, the second identification unit 141 may be used to perform Step 401 in the method embodiments above, the starting point determination unit 142 may be used to perform Step 402 in the method embodiments above, the ending point determination unit 143 may be used to perform Step 403 in the method embodiments above, the second extraction unit 144 may be used to perform Step 404 in the method embodiments above, and the second filtering unit 145 may be used to perform Step 405 in the method embodiments above.

Figure 9:
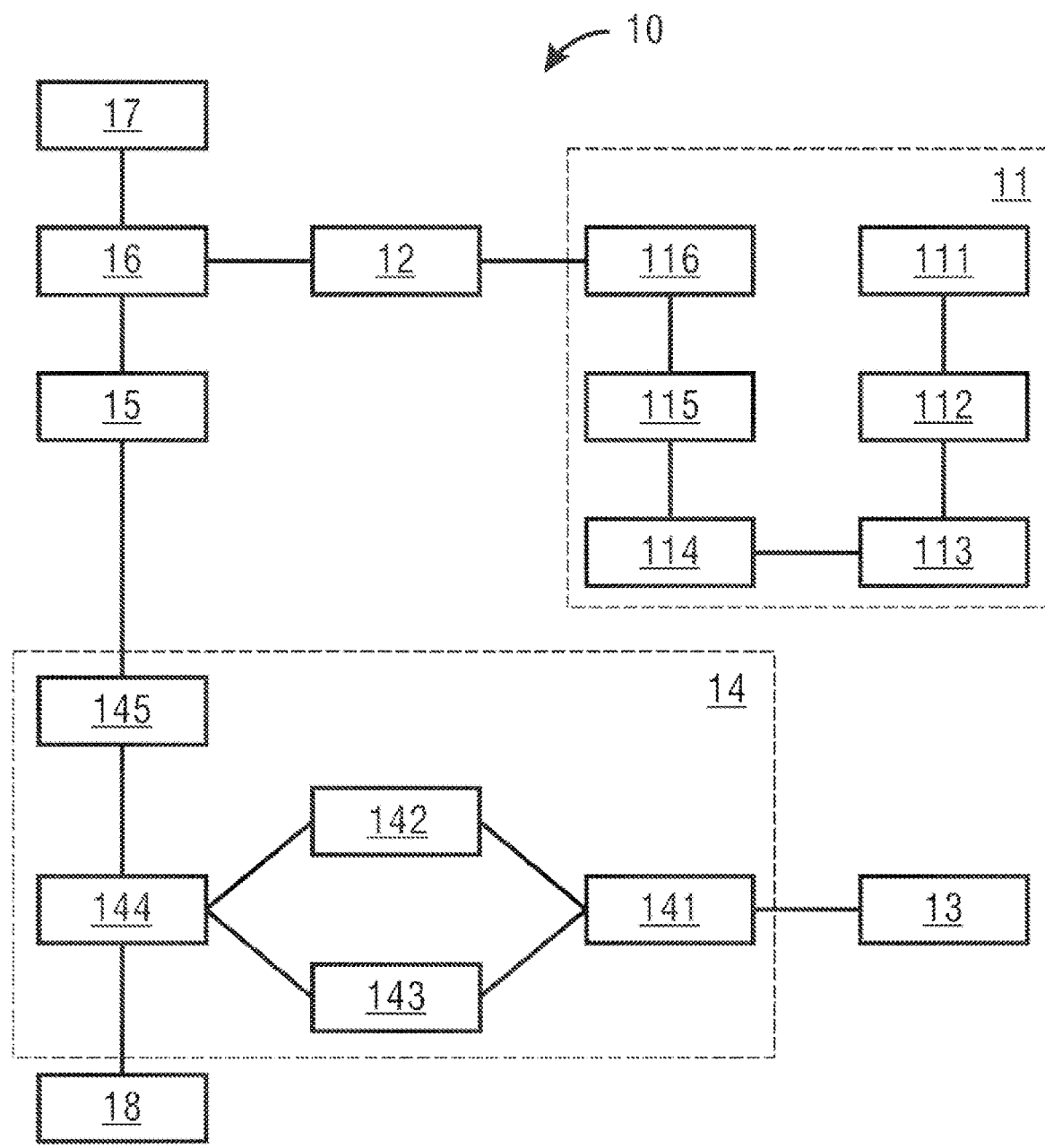
FIG. 9 is a schematic diagram of an industrial network behavior analysis apparatus comprising a second analysis module incorporating teachings of the present disclosure.

In some embodiments, on the basis of the industrial network behavior analysis apparatus 10 shown in FIG. 8, as shown in FIG. 9, the industrial network behavior analysis apparatus 10 further comprises: a second analysis module 18 used to, for each fifth time window defined by the second extraction unit 144, if the control instruction collected in the fifth time window does not satisfy the complexity rule, determine whether each control instruction executed in the fifth time window is on a preset instruction white list, and that a control instruction is a legal control instruction if the control instruction executed in the fifth time window is on the instruction white list and a control instruction is a suspicious control instruction if the control instruction executed in the fifth time window is not on the instruction white list.

In some embodiments, on the basis of the industrial network behavior analysis apparatus 10 shown in any of FIGS. 5 to 9, the control instruction comprises at least one control command sequentially executed, wherein a control command is the basic unit for device control and status feedback in the target industrial control system, and each control command may comprise at least one related parameter.

Figure 10:
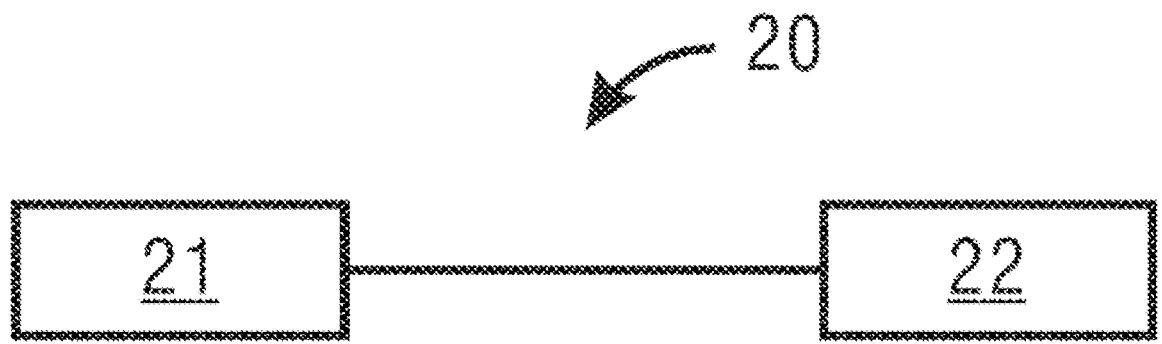
FIG. 10 is a schematic diagram of an industrial network behavior analysis apparatus comprising a memory and a processor incorporating teachings of the present disclosure.

As shown in FIG. 10, some embodiments of the teachings of the present disclosure include an industrial network behavior analysis apparatus 20, comprising: at least one memory 21 and at least one processor 22; the at least one memory 21 is used to store a machine-readable program; and the at least one processor 22 is used to call the machine-readable program to execute the industrial network behavior analysis method provided by each of the above embodiments.

Figure 11:
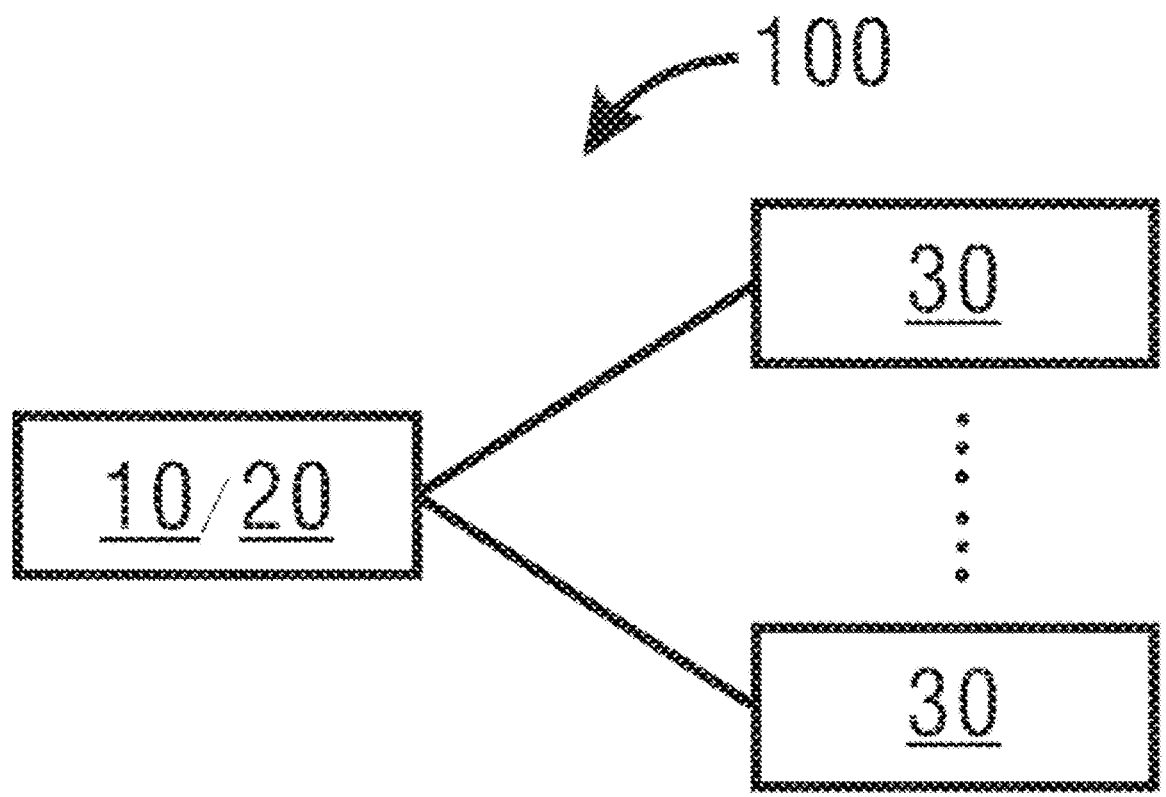
FIG. 11 is a schematic diagram of an industrial network behavior analysis system incorporating teachings of the present disclosure.

As shown in FIG. 11, some embodiments of the teachings of the present disclosure include an industrial network behavior analysis system 100, comprising: an industrial network behavior analysis apparatus 10/20 provided by any of the above embodiments and at least one industrial control system 30.

In some embodiments, probes may be provided in each industrial control system 30, and the industrial network behavior analysis apparatus 10/20 uses each of the probes to respectively collect the control instructions in each industrial control system 30, thereby analyzing the industrial network behaviors of a plurality of industrial control systems 30.

In some embodiments, there is a computer-readable medium, which stores an instruction used to cause a computer to execute the industrial network behavior analysis method described herein. Specifically, a system or device equipped with a storage medium may be provided, and the software program code for implementing the functions of any of the above embodiments is stored on the storage medium, so that a computer (or CPU or MPU) of the system or device reads and executes the program code stored in the storage medium. In this case, the program code itself read from the storage medium can implement the functions of any of the above embodiments, and so the program code and the storage medium storing the program code constitute part of the present invention.

Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer via a communication network.

In some embodiments, the operating system operating on a computer may be used to perform part or all of the actual operations and thus implement the functions of any of the above embodiments not only through executing a program code read by the computer but also through an instruction based on the program code.

In some embodiments, it is possible to write the program code read from the storage medium to the memory provided in an expansion board inserted into the computer or to the memory provided in an expansion unit connected to the computer, and then the program code-based instructions cause the CPU, etc. mounted on the expansion board or the expansion unit to perform part and all of the actual operations, so as to implement the functions of any of the above embodiments.

It should be noted that not all steps and modules in the above processes and system structural diagrams are necessary, and some steps or modules may be ignored based on actual needs. The sequence of execution of the steps is not fixed, and can be adjusted as needed. The system structure described in the above embodiments may be a physical structure or a logical structure, i.e., some modules may be implemented by the same physical entity, or some modules may be implemented by multiple physical entities, or may be implemented by certain components in several independent devices working together.

In some embodiments, the hardware units may be implemented mechanically or electrically. For example, a hardware unit may comprise a permanent dedicated circuit or logic (such as a dedicated processor, FPGA or ASIC) to complete the corresponding operation. The hardware unit may also comprise a programmable logic or circuit (such as a general-purpose processor or other programmable processors), which may be temporarily set by software to complete the corresponding operation. The specific implementation method (mechanical, or by a dedicated permanent circuit, or a temporarily set circuit) may be determined based on the cost and time considerations.

The teachings present disclosure has been demonstrated and described in detail through the drawings and example embodiments above. However, the scope of the present disclosure is not limited to these disclosed embodiments. Based on the above embodiments, those skilled in the art can know that the code review methods in the different embodiments above may be combined to obtain more embodiments of the present invention, and these embodiments also fall within the scope of the present disclosure.

The invention claimed is:

1. An industrial network behavior analysis method comprising:
    defining a first time window for a target industrial control system, wherein the first time window characterizes a time period for the target industrial control system to perform a corresponding control behavior;
    respectively determining an execution probability deviation for each control instruction in the target industrial control system within the first time window, wherein the execution probability deviation characterizes a fluctuation of a execution probability of the corresponding control instruction, and the execution probability is used to characterize a ratio of the number of times the corresponding control instruction is executed within the time period to the total number of times the control instruction within the time period;
    collecting the control instruction executed in the target industrial control system;
    defining a second time window according to the collected control instruction, wherein the second time window characterizes a time period when the target industrial control system performs the corresponding control behavior, and the control behavior performed by the target industrial control system in the second time window is the same as that performed in the first time window; and
    performing the following for the second time window:
    for each control instruction executed in the second time window, calculating an execution probability of the control instruction in the second time window;
    for each control instruction executed in the second time window, determining whether the execution probability of the control instruction meets a target execution probability deviation, wherein the target execution probability deviation is the execution probability deviation of the control instruction in the first time window corresponding to the same control behavior in the second time window;
    determining that the control instruction is a legal control instruction if the execution probability of the control instruction meets the target execution probability deviation; and
    determining that the control instruction is a suspicious control instruction if the execution probability of the control instruction does not meet the target execution probability deviation.

2. The method as claimed in claim 1, wherein defining the first time window for a target industrial control system comprises:
    collecting the control instruction in a preset learning time period;
    when a first control instruction corresponding to the start identifier of a preset time window is collected, determining a first time when the first control instruction is collected as the starting point of the time window;
    when a second control instruction corresponding to a end identifier of the preset time window is collected, determining a second time when the second control instruction is collected as the ending point of the time window;
    defining a time period between each pair of sequentially adjacent starting point of the time window and ending point of the time window as a third time window;
    for each third time window, defining the respective third time window as a fourth time window if the control instruction collected in the third time window satisfies a preset complexity rule;
    grouping the fourth time windows to obtain at least one time window group, wherein each time window group comprises a fourth time window, and the target industrial control system performs the same control behavior within each of the fourth time windows comprised in the same time window group and performs different control behaviors within the fourth time windows comprised in different time window groups;
    forming a corresponding first time window for each time window group, wherein the first time window and each of the fourth time windows comprised in the time window group corresponding to the first time window have the same starting point and end point of the time window, or the first time window and each of the fourth time windows comprised in the time window group corresponding to the first time window have the same time length.

3. The method as claimed in claim 2, wherein respectively determining an execution probability deviation of each control instruction in the target industrial control system within the first time window comprises:

for each fourth time window, calculating the execution probability of each of the control instructions executed in the respective fourth time window;

performing the following for each time window group:
for each control instruction executed in each of the fourth time windows comprised in the time window group, calculating the execution probability deviation of the control instruction in the first time window corresponding to the time window group according to the execution probability of the control instruction in each of the fourth time windows comprised in the time window group.

4. The method as claimed in claim 2, wherein defining a second time window according to the collected control instruction comprises:
identifying the start identifier and the end identifier of the second time window from the collected control instruction;
for the identified start identifier of the time window, determining a first time when the control instruction corresponding to the start identifier of the time window is collected as the starting point of the time window;
for the identified end identifier of the time window, determining a second time when the control instruction corresponding to the end identifier of the time window is collected as the ending point of the time window;
defining the time period between each determined pair of sequentially adjacent starting point of the time window and ending point of the time window as a fifth time window;
for the fifth time window, defining the fifth time window as a second time window if the control instruction collected in the fifth time window satisfies the complexity rule and there is a first time window corresponding to the same control behavior as that of the fifth time window.

5. The method as claimed in claim 4, the method further comprising:
for the fifth time window, if the control instruction collected in the fifth time window does not satisfy the complexity rule, determining whether each control instruction executed in the fifth time window is on a preset instruction white list;
if the control instruction is on the preset instruction white list, determining that the control instruction is a legal control instruction; and
if the control instruction is not on the preset instruction white list, determining that the control instruction is a suspicious control instruction.

6. The method as claimed in claim 1, wherein:
the control instruction comprises at least two control commands sequentially executed;
each control command is a basic unit for device control and status feedback in the target industrial control system; and
each control command comprises at least one related parameter.

7. An industrial network behavior analysis apparatus comprising:
a memory; and
a processor;
wherein the memory stores a machine-readable program; and
the processor calls the machine-readable program to execute the method as claimed in any of claim 1.

8. An industrial network behavior analysis apparatus comprising:

a first identification module to define a first time window for a target industrial control system, wherein the first time window characterizes a time period for the target industrial control system to perform a corresponding control behavior;
a deviation calculation module to respectively determine an execution probability deviation of each control instruction within the first time window defined by the first identification module, wherein the execution probability deviation characterizes a fluctuation of the execution probability of the corresponding control instruction, and a execution probability characterizes a ratio of a number of times the corresponding control instruction is executed within the time period to a total number of times the control instruction is executed within the time period;
an instruction collection module to collect the control instruction executed in the target industrial control system;
a second identification module to define a second time window according to the control instruction collected by the instruction collection module, wherein the second time window characterizes a time period when the target industrial control system performs the corresponding control behavior, and the control behavior performed by the target industrial control system in the second time window is the same as that performed in the first time window;
a probability calculation module to, for each second time window defined by the second identification module, calculate the execution probability of a control instruction in the second time window for each of the control instructions executed in the second time window;
a probability comparison module to, for each second time window defined by the second identification module, for each of the control instructions executed in the second time window, determine whether the execution probability of the control instruction calculated by the probability calculation module meets a target execution probability deviation, wherein the target execution probability deviation is the execution probability deviation of the control instruction in the first time window corresponding to the same control behavior in the second time window as calculated by the deviation calculation module; and
a first analysis module to, based on the result of the probability comparison module, determine that a control instruction is a legal control instruction if the execution probability of the control instruction meets the target execution probability deviation, and that a control instruction is a suspicious control instruction if the execution probability of the control instruction does not meet the target execution probability deviation.

9. The apparatus as claimed in claim 8, wherein the first identification module comprises:
a collecting unit to collect the control instruction executed in the target industrial control system in a preset learning time period;
a first identification unit to determine a first time when a first control instruction is collected as the starting point of the first time window when the collecting unit collects the first control instruction corresponding to the start identifier of a preset time window, and determine a second time when a second control instruction is collected as the ending point of the first time window when the collecting unit collects the second control instruction corresponding to the end identifier of the preset time window;

a first extraction unit to define a time period between each determined pair of sequentially adjacent starting point of the first time window and ending point of the first time window determined by the first identification unit as a third time window;

a first filtering unit to, for each third time window defined by the first extraction unit, define a third time window as a fourth time window if the control instruction collected in the third time window satisfies a preset complexity rule;

a time window grouping unit to group any fourth time windows defined by the first filtering unit to obtain at least one time window group, wherein each time window group comprises at least one fourth time window, and the target industrial control system performs the same control behavior within each of the fourth time windows comprised in the same time window group and performs different control behaviors within the fourth time windows comprised in different time window groups; and a time window generation unit to form a corresponding first time window for each time window group defined by the time window grouping unit, wherein the first time window and each of the fourth time windows comprised in the time window group corresponding to the first time window have the same starting point and end point of the time window, or the first time window and each of the fourth time windows comprised in the time window group corresponding to the first time window have the same time length.

10. The apparatus as claimed in claim 9, wherein the deviation calculation module comprises:

a probability calculation unit to respectively calculate the execution probability of each of the control instructions executed in each of the fourth time windows comprised in the time window group; and a deviation calculation unit to, for each time window group, for each control instruction executed in each of the fourth time windows comprised in the time window group, calculate the execution probability deviation of the control instruction in the first time window corresponding to the time window group according to the execution probability of the control instruction in each of the fourth time windows comprised in the time window group as calculated by the probability calculation unit.

11. The apparatus as claimed in claim 9, wherein the second identification module comprises:

a second identification unit to identify the start identifier and the end identifier of the respective time window from the collected control instruction;

a starting point determination unit to, for each identified start identifier of the respective time window identified by the second identification unit, determine a start time when the control instruction corresponding to the start identifier of the time window is collected as the starting point of the respective time window;

an ending point determination unit to, for the end identifier of the respective time window identified by the second identification unit, determine an end time when the control instruction corresponding to the end identifier of the time window is collected as the ending point of the time window;

a second extraction unit to define the time period between each pair of sequentially adjacent starting point of the time window and ending point of the time window determined by the starting point determination unit and the ending point determination unit as a fifth time window; and a second filtering unit to, for each fifth time window defined by the second extraction unit, define the fifth time window as a second time window if the control instruction collected in the fifth time window satisfies the complexity rule and there is a first time window corresponding to the same control behavior as that of the fifth time window.

12. The apparatus as claimed in claim 11, further comprising a second analysis module to, for any fifth time window defined by the second extraction unit, if the control instruction collected in the respective fifth time window does not satisfy the complexity rule, determine whether each control instruction executed in the respective fifth time window is on a preset instruction white list, and that a control instruction is a legal control instruction if the control instruction executed in the respective fifth time window is on the instruction white list and a control instruction is a suspicious control instruction if the control instruction executed in the respective fifth time window is not on the instruction white list.

13. The apparatus as claimed in claim 8, wherein:

the control instruction comprises at least two control commands sequentially executed, wherein each control command is a basic unit for device control and status feedback in the target industrial control system; and each control command may comprise at least one related parameter.

* * * * *